United States Patent [19]

Oosaka et al.

[11] 4,295,589
[45] Oct. 20, 1981

[54] DEVICE FOR FEEDING WEB WITH TEMPERATURE COMPENSATING MEANS

[75] Inventors: Shigenori Oosaka; Makoto Murakoshi, both of Asaka, Japan

[73] Assignee: Fuji Photo Film Co., Ltd., Minami-ashigara, Japan

[21] Appl. No.: 152,190

[22] Filed: May 22, 1980

[30] Foreign Application Priority Data

May 25, 1979 [JP] Japan .............................. 54-64623

[51] Int. Cl.³ .......................................... B65H 17/26
[52] U.S. Cl. .................................. 226/122; 226/136; 226/190
[58] Field of Search ............... 226/122, 136, 182, 183, 226/190, 191, 152-155, 23; 100/163 R, 168, 169

[56] References Cited

U.S. PATENT DOCUMENTS 4,061,260 12/1977 Copp .................................. 226/139
4,158,429 6/1979 Ohmori .................................. 226/34

*Primary Examiner*—Leonard D. Christian
*Attorney, Agent, or Firm*—Fleit & Jacobson

[57] ABSTRACT

A device for feeding a web like a microfilm by use of rubber rollers has a stepping motor for driving the rubber roller. The stepping motor is controlled by a pulse generator. A temperature detector is provided for measuring the temperature of the rubber roller or any part of the device having a temperature substantially equal to the rubber roller. The output of the temperature detector is sent to the pulse generator for controlling the stepping motor according to the measured temperature. When the temperature is raised, the stepping motor is controlled to reduce the speed of rotation and the increase in feeding speed due to expansion of the rubber roller is compensated, thereby feeding the web at a constant speed irrespective of the temperature fluctuation.

4 Claims, 2 Drawing Figures

DEVICE FOR FEEDING WEB WITH TEMPERATURE COMPENSATING MEANS

BACKGROUND OF THE INVENTION

1. Field of the Invention

This invention relates to a device for feeding a web, and more particularly to an improvement in a web feeding device employing rubber rollers as feed rollers.

2. Description of the Prior Art

In a web feeding device for feeding a photographic film like a microfilm, there have been used rubber rollers. The rubber rollers are advantageous as compared with metal rollers in that they have much less friction, smaller inertia and soft surface and accordingly they can be driven by a motor of small torque and will not damage the surface of the film. Therefore, the rubber rollers have been desired as the feed rollers for feeding a roll film like a microfilm in a microfilm reader, a microfilm camera or the like.

As one of the microfilm recorders there has been known a computer output microfilmer (COM) which records the output of a computer directly on a microfilm. In the COM, there are two types of display system in one of which the output of a computer is once displayed on a CRT and the image on the CRT is optically focused on a microfilm for recording the image thereon, and in the other the output of the computer is directly recorded on a microfilm by a scanning laser beam modulated by the output signal from the computer which is called "laser com." In the COM, an X-Y direction driving mechanism is provided for moving the microfilm in the X and Y directions to carry each frame to the recording station. The X-Y direction driving mechanism is driven by a motor, which is heated during operation and warms the interior of the COM.

Further, there are photosensitive type recording film and a heat sensitive type recording film in the film to be used in the laser com. The heat sensitive film is able to be monitored simultaneously with recording. In the monitoring operation, it is necessary to illuminate the recorded part of the film. The illuminating device, however, further heats the interior of the COM.

When the sequential temperature fluctuation in the apparatus is large as mentioned above due to the heating, the diameter of the rubber roller for feeding the microfilm is changed and accordingly the amount of film feed is changed. For example, when the rubber roller is made of urethane rubber (specific gravity: 1.27, hardness: 80) having a diameter of 23 mm, the fluctuation for the amount of film feed of 150 mm is about 0.03 mm/C.° since the linear expansion coefficient is $2 \times 10^{-4}/C.°$ (20° C.-100° C.). Therefore, when the temperature within the apparatus rises 40° C., there appears an error of 1.2 mm.

The above error in the amount of film feed is serious particularly in case of COM ($148 \pm 01.0$ in the standard of National Micrographics Association). In the conventional apparatus, however, the error in the amount of film feed due to the sequential temperature varation has not been corrected.

SUMMARY OF THE INVENTION

The object of the present invention is therefore to provide a device for feeding a web in which the fluctuation in the amount of web feed or the fluctuation in the web feeding speed due to the variation in the diameter of the web feeding roller caused by the temperature fluctuation is automatically corrected.

A more specific object of the present invention is to provide a microfilm feeding mechanism in which the film feeding speed is maintained constant irrespective of the temperature within or outside the film feeding mechanism by correcting the fluctuation in the web feeding speed in accordance with the temperature fluctuation.

The web or film feeding device in accordance with the present invention is characterized in that the speed of revolution of the rubber roller used for feeding the web or film is controlled dependent upon the temperature so that the web or film may be fed at a constant speed irrespective of the temperature around the feeding device.

The device in accordance with the present invention comprises a rubber roller for feeding a web, a stepping motor for driving the rubber roller provided with a pulse generator for operating the same, a temperature detecting means for detecting the temperature of the rubber roller, and a temperature compensating means for controlling the speed of revolution of said stepping motor by controlling the number of pulses generated by said pulse generator according to the temperature detected by said temperature detecting means. The temperature of the rubber roller referred to above may not necessarily be the temperature of the rubber roller itself, but may be that of a member having a temperature substantially equal to that of the rubber roller.

In accordance with the present invention, since the rubber roller for feeding the web or film is driven at a controlled speed to feed the film at a constant speed irrespective of the temperature. Since the control is made by controlling the number of pulses generated by a pulse generator, the structure of the mechanism is very simple and is able to be manufactured at low cost.

DESCRIPTION OF THE PREFERRED EMBODIMENT

Figure 1:
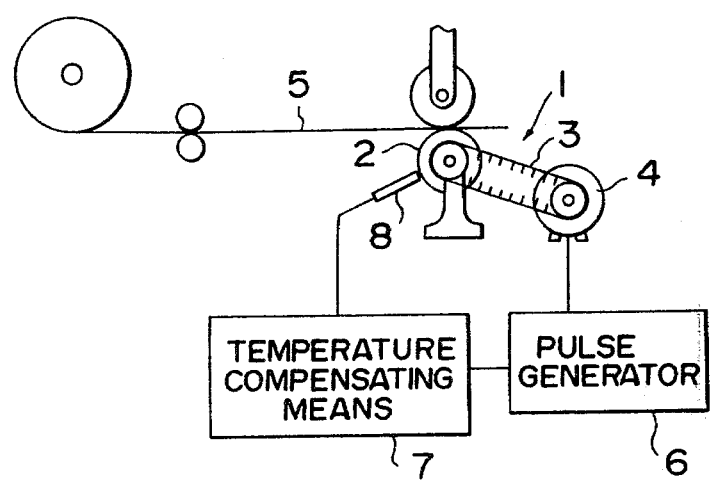
FIG. 1 is a schematic side view showing the principal mechanism of the web feeding device in accordance with the present invention.
Figure 2:
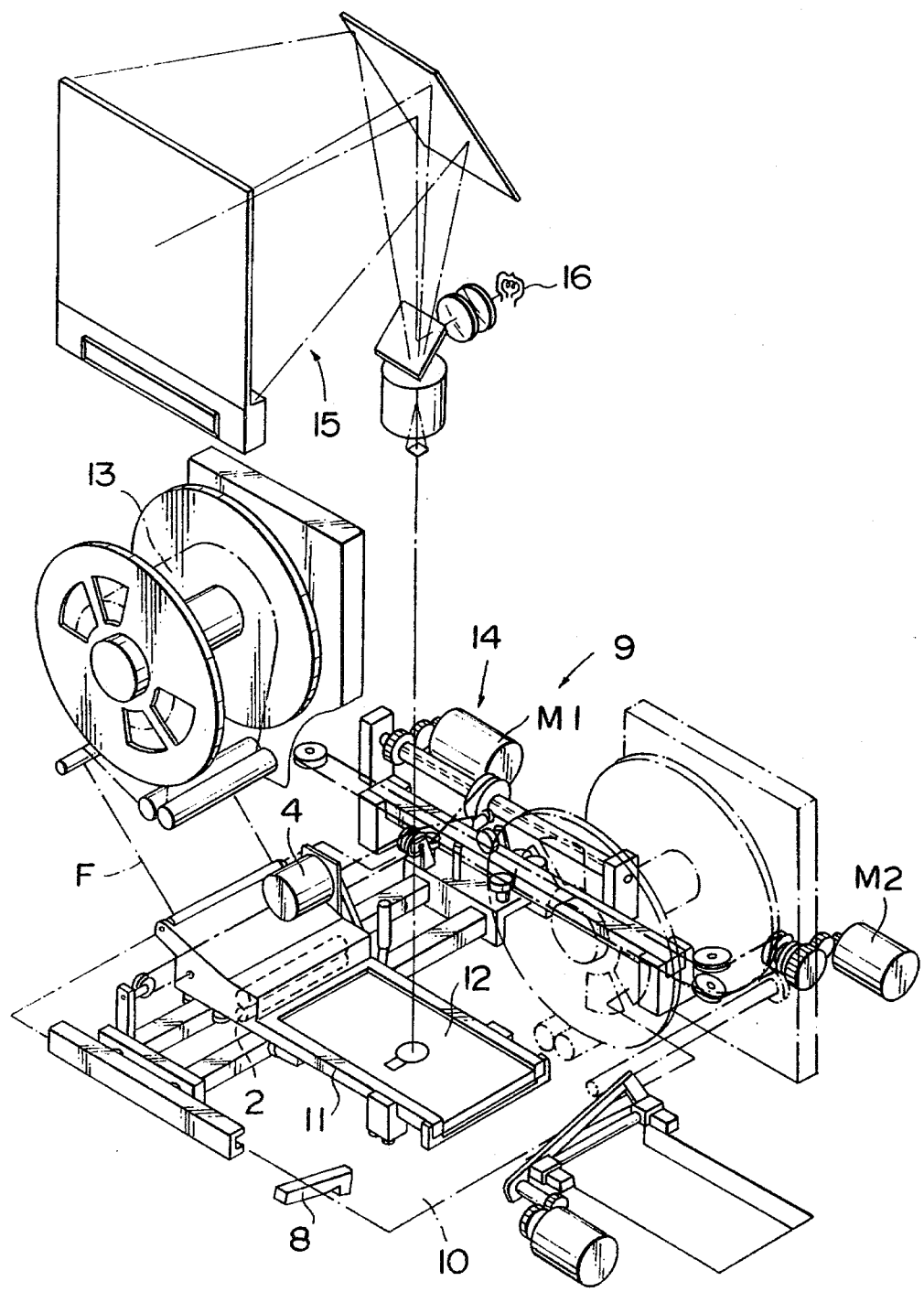
FIG. 2 is a perspective view showing an embodiment of the present invention applied to a laser com.

Now the present invention will be described in detail with reference to the drawing. Referring to FIG. 1, the web feeding device 1 of this invention has a web feeding roller 2 made of rubber like urethane rubber. The feed roller 2 is connected with a stepping motor 4 by way of a non-slipping power transmission means 3 like a chain and is rotated by the stepping motor 4 to feed a web 5 like a microfilm. The stepping motor 4 is rotated by one step by one pulse given by a pulse generator 6 connected therewith.

When the diameter of the feed roller 2, the amount of rotation for one step of the stepping motor 4 and the reduction ratio of the power transmission means 3 are designed to feed the web 5 by 0.25 mm in response to one pulse given to the stepping motor 4, 600 pulses are to be given to the stepping motor 4 for feeding the web 5 by 150 mm.

The pulse generator 6 is connected with a temperature compensating means 7 which is in turn connected with a temperature detecting means 8 that is provided for detecting the temperature of the feed roller 2. The temperature compensating means 7 controls the pulse generator 6 so as to increase or decrease the number of pulses generated thereby.

For example, when a thermistor is used as the temperature compensating means 7, the temperature fluctuation of the feed roller 2 is detected in the form of electric resistance fluctuation and is output in the form of voltage fluctuation. The output voltage thus obtained is input into a voltage comparator to output a signal corresponding to a temperature fluctuation, which is used for increasing or decreasing the number of pulses generated by the pulse generator 6. The addition to or subtraction from a standard number of pulses is determined by the output signal.

For example, when the feed roller 2 is made of urethane rubber having a diameter of 23 mm, there occurs a fluctuation of about 0.03 mm/C.° in the amount of web feed for the feed of 150 mm since the linear expansion coefficient of the urethane rubber is $2 \times 10^{-4}$/°C. (20°–100° C.). Therefore, when the temperature of the feed roller 2 is raised 40° C., there occurs an error of plus 1.2 mm. As mentioned above, since the amount of feed of web for one pulse given to the stepping motor 4 is made 0.25 mm, it is possible to feed the web at a constant speed or by a constant amount (150 mm$\pm$0.25) by decreasing the number of pulses one by one for the rise of 8° C. of the feed roller 2. When the temperature is lowered, the number of pulses is increased.

Now, the present invention will be described in further detail with reference to a particular embodiment thereof incorporated in a laser com.

A laser com 9 is provided with a rectangular base board 10 on which a microfilm stage 11 is provided movable in X-Y directions. The stage 11 supports a stepping motor 4 thereon for driving a feed roller 2 and is provided with a stage surface 12 on which a microfilm F is placed to receive a laser beam. The feed roller 2 feeds out a microfilm F of one frame or one microfiche size from a microfilm roll 13 onto the stage surface 12. On the microfilm F supplied on the stage surface 12 a laser beam modulated by the output of a computer is caused to scan for recording information. When one frame of information has been recorded on the microfilm F, the stage 11 is moved to bring the next frame to the position for recording by an X-Y direction drive mechanism 14. The X-Y direction drive mechanism 14 has motors M1 and M2. These motors M1 and M2 are heated during operation and warms the ambient atmosphere.

Above the stage 11 is provided a monitor 15 for monitoring the state of recording information on the microfilm. The monitor 15 is provided with an illuminating light source 16 which also emits heat.

By the motors M1 and M2 and the light source 16 the interior of the laser com 9 is heated and the temperature of the feed roller 2 is raised and thermally expanded.

In the laser com 9, a temperature detecting means 8 is provided for detecting the temperature of the base board 10. This is because the feed roller 2 is rotating and movable in the X-Y directions and accordingly it is difficult to mount the temperature detecting means 8 on the feed roller 2, and because the base board 10 is stationary and easy to mount the detecting means and further has the temperature substantially equal to the feed roller 2.

The temperature detected by the temperature detecting means 8 is converted to an electrical signal and the signal is sent to the temperature compensating means 7. The temperature compensating means 7 controls the amount of film feed by the food roller 2 by, for example, decreasing the number of pulses generated by the pulse generator 6 by one pulse when it is detected the temperature detecting means 8 has detected the temperature rise of 8° C.

It should be noted that the above film feeding device of the intermittent feed type may be replaced by a film feeding device of the continuous feed type.

We claim:

1. A device for feeding a web comprising a rubber roller for feeding a web, a stepping motor for driving the rubber roller by way of a power transmission means, a pulse generator connected wih the stepping motor for driving the stepping motor by the pulses generated thereby, a temperature detecting means for detecting the temperature of the rubber roller directly or indirectly, and a temperature compensating means for controlling the number of pulses generated by the pulse generator according to the temperature detected by said temperature detecting means in such a manner that the speed of rotation of said rubber roller is controlled to effect the constant speed of web feeding irrespective of the temperature detected, whereby the web is fed at a constant speed irrespective of the temperature of the rubber roller.

2. A device for feeding a web as defined in claim 1 wherein said web is a microfilm.

3. A device for feeding a web as defined in claim 1 wherein said temperature detecting means detects the temperature of the rubber directly.

4. A device for feeding a web as defined in claim 1 wherein said temperature detecting means detects the temperature of a part of the web feeding device which has substantially the same temperature as that of the rubber roller.

* * * * *